UNITED STATES PATENT OFFICE.

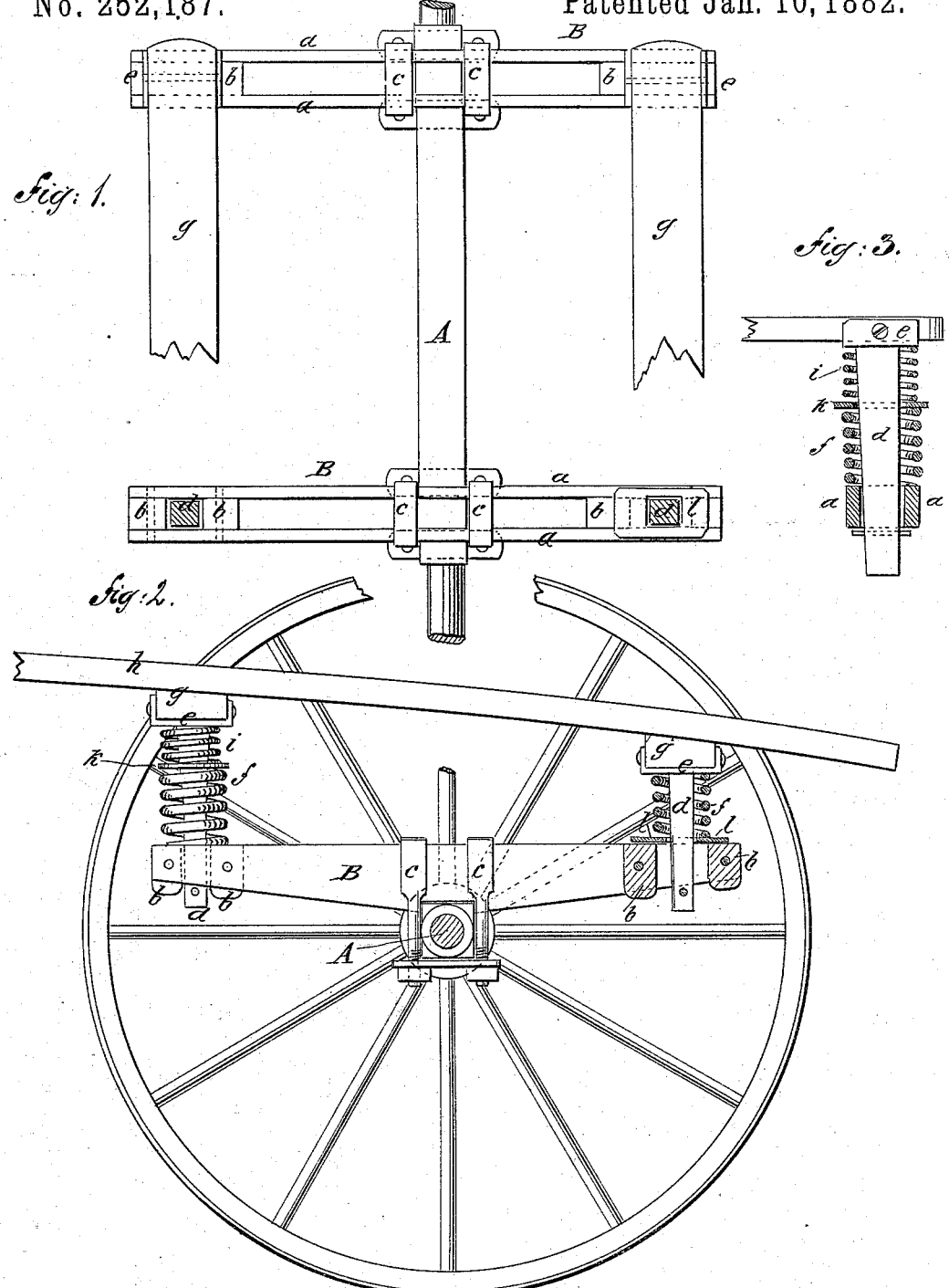

EDWARD CLARK, OF NEW YORK, N. Y.

PLATFORM-GEAR FOR WAGONS.

SPECIFICATION forming part of Letters Patent No. 252,187, dated January 10, 1882.

Application filed November 10, 1881. (No model.)

*To all whom it may concern:*

Be it known that I, EDWARD CLARK, of the city, county, and State of New York, have invented a new and Improved Platform-Gear for Trucks and Wagons, of which the following is a full, clear, and exact description.

The object of my invention is to provide for trucks and wagons durable and substantial platform-gear less expensive than the leaf-spring gearing generally employed; and to that end my invention consists in a spiral-spring platform constructed and arranged as hereinafter described and claimed.

Reference is to be had to the accompanying drawings, forming part of this specification, in which similar letters of reference indicate corresponding parts in all the figures.

Figure 1 is a sectional plan view of a platform embodying my invention. Fig. 2 is a sectional side view of the gearing as applied to the rear axle of a truck, and Fig. 3 is a detail section.

A similar platform is applied to both the forward and the rear axle of the truck or wagon. A is the rear axle of a truck.

B B are the side bars of the platform, each composed of two rigid metal plates, $a$ $a$, separated by filling-pieces $b$ $b$, that are secured between the plates at their ends. The bars B are clamped to the axle above it, as shown, or below, if a lower platform is desired, by clips $c$.

$d$ $d$ are posts, formed with flanged head-plates $e$ $e$ at their upper ends, and extending at their lower end between the plates $a$ in the spaces between the filling-pieces $b$.

$f f$ are spiral springs around the posts $d$, between the bars B and the head-plates $e$.

$g$ $g$ are cross-bars secured to the head-plates $e$, and $h$ is the truck-floor resting on bars $g$, so that the springs $f$ take the weight.

On the forward posts $d$ there are additional spiral springs, $i$, placed next to the head-plates $e$ and above plates $k$, that separate the two springs on each post. These springs $i$ are comparatively light, and are intended to render the truck more easy riding when unloaded. Under a load they are compressed so that the mainsprings $f$ take the weight. At the rear post the springs $f$ rest on plates $l$, and the filling-pieces $b$ are separated to allow the springs and posts to slide. This occurs by the endwise movement of the arched truck-floor $h$ when a heavy load is placed on it or removed therefrom. Suitable pins in the lower ends of posts $d$ limit their upward movement.

The gearing of this construction is substantial and durable, and in comparison with gearing using leaf-springs is much less expensive in first cost and for repairs.

The side bars, B, may be constructed of malleable iron in a single piece cored out to the form shown.

Having thus described my invention, I claim as new and desire to secure by Letters Patent—

1. In platform-gearing for trucks and wagons, the apertured side bars, B, posts $d$, provided with head-plates $e$, spiral springs $f$, and cross-bars $g$, substantially as shown and described, combined for operation as set forth.

2. In platform-gearing, the light spiral springs $i$, in combination with the posts $d$, head-plates $e$, and main springs $f$, substantially as and for the purposes set forth.

3. The combination of the arched truck-floor $h$, cross-bars $g$, head-plates $e$, supporting-posts $d$, springs $f$, and connected side plates, $a$ $a$, separated by pieces $b$, substantially as shown and described.

EDWARD CLARK.

Witnesses:
GEO. D. WALKER,
C. SEDGWICK.